United States Patent

Noyes

[11] 4,075,058
[45] Feb. 21, 1978

[54] ARTICULATED FUEL ASSEMBLY

[75] Inventor: Richard Croissant Noyes, Hartford, China /Taiwan

[73] Assignee: Combustion Engineering, Inc., Windsor, Conn.

[21] Appl. No.: 665,018

[22] Filed: Mar. 8, 1976

Related U.S. Application Data

[62] Division of Ser. No. 296,737, Oct. 11, 1972, abandoned.

[51] Int. Cl.² ............................................. G21C 7/30
[52] U.S. Cl. .................................... 176/21; 176/40; 176/87; 176/50; 176/67
[58] Field of Search .................. 176/40, 50, 28, 78–80, 176/85, 87, 21, 67; 285/166

[56] References Cited

U.S. PATENT DOCUMENTS

| T911,015 | 6/1973 | Garkisch et al. | 176/85 |
|---|---|---|---|
| 1,187,642 | 6/1916 | Milz | 285/166 |
| 3,219,535 | 10/1965 | Robbins | 176/17 |
| 3,275,521 | 9/1966 | Schluderberg et al. | 176/18 |
| 3,433,504 | 3/1969 | Hanes | 285/166 |
| 3,629,070 | 12/1971 | Stankiewicz | 176/40 |
| 3,671,394 | 6/1972 | Bernath et al. | 176/40 |
| 3,682,774 | 8/1972 | Beyer | 176/85 |
| 3,708,393 | 1/1973 | Waymire et al. | 176/85 |
| 3,753,856 | 8/1973 | Ash | 176/85 |

FOREIGN PATENT DOCUMENTS

| 1,034,432 | 7/1958 | Germany | 285/166 |
|---|---|---|---|

*Primary Examiner*—Samuel W. Engle
*Assistant Examiner*—S. A. Cangialosi

[57] ABSTRACT

An articulated fuel assembly for the core of a fast spectrum reactor comprising an elongated shroud enclosing a cluster of fuel pins, a support foot assembly supporting the fuel assembly in the reactor core and an articulating connector link joining the support foot assembly and the lower end of the elongated shroud. The upper end of the elongated shroud and the support foot assembly are adapted to be fixedly restrained against lateral movement when the assembly is placed in the reactor core. The articulating connector link is such as to permit free lateral deflection of the lower end of the shroud relative to the upper end of the shroud and the foot assembly. Such an arrangement increases the reliability of the fuel assembly and safely accommodates the physical distortions in the fuel assemblies caused by neutron induced swelling of the members and thermally induced expansions thereof by reducing stresses in the structural parts of the assembly and by insuring a negative reactivity for the core as the lower ends of the fuel assemblies are laterally displaced.

4 Claims, 4 Drawing Figures

ARTICULATED FUEL ASSEMBLY

Reference is made to the following co-pending application, the benefit of the filing date of which is hereby claimed: Application for ARTICULATED FUEL ASSEMBLY by Richard Croissant Noyes, Ser. No. 296,737, filed Oct. 11, 1972 now abandoned, of which this application is a divisional thereof.

BACKGROUND OF THE INVENTION

This invention relates to a fuel assembly for fast spectrum reactor and more particularly to a double articulated fuel assembly. By articulated it is meant that the fuel assemblies are provided with either joints or localized areas of increased or complete flexibility.

A typical fuel assembly for a fast spectrum or breeder reactor is of the closed housing type and requires that the housing be flexible through the high heat and neutron flux region of the core. There must be a clamping arrangement for the fuel assembly to retain the assembly in a "tight" core arrangement (orientation and position relative to neighboring assembly) for proper reactor control yet each assembly must be able to distort as hereinafter described. The upper and lower ends of each assembly are held essentially vertically and in line by the engagement of the lower end of the assembly in support plates or tube sheets and the top of the element being tightly clamped in a packed matrix of interfitting hexagonally shaped members.

The nuclear reactor fuel assemblies of a fast breeder reactor undergo physical changes along their axial length when irradiated by a non-uniform neutron flux. These changes include bowing due to differential effects of irradiation swelling and dilation (swelling) of the structural components of the housing between the two fixed ends of the element. Similarly, fuel assembly distortions occur when each assembly is subjected to adverse thermal conditions where one of its longitudinal sides is at a greater temperature than its opposite side. The fuel assembly will become distorted and tend to bow convexly in the direction of the greatest temperature. This bowing effect, whether thermally activated or due to swelling, imparts strain to the assembly housing and associated hardware particularly in the region just above the bottom support plate or tube sheet rigidly retaining the base portion of each of the fuel assemblies within the reactor core.

Both of these effects tend to cause the fuel assembly to become bent along its length between the upper and lower points of restraint. If the fuel assemblies are not allowed to undergo the physical distortions mentioned hereinabove, then this bending can lead to excessive housing stresses and/or difficulties in refueling the reactor and/or unsafe changes in the reactivity of the core.

One solution for alleviating this problem of physical distortion has been to provide a single articulating ball joint intermediate the lower end of the fuel assembly housing and the lower restraint. Such a system is described in U.S. Pat. No. 3,671,394 to Bernath et al entitled "Articulated Fuel Element Housing". The use of this ball joint permits the lower end of the fuel assembly housing to pivot or rotate about the ball joint as the housing is subjected to the neutron flux and thermal gradients in the core and distorted along its length. While such a fuel assembly has alleviated some of the problems experienced by completely rigid fuel assemblies, its use is still limited by the flexibility of the housing along its length.

SUMMARY OF THE INVENTION

Accordingly, there is provided an articulated fuel assembly which overcomes the above mentioned and other disadvantages. The present invention comprises an elongated fuel assembly housing for containing a plurality of fuel elements, a support foot assembly for supporting the fuel assembly in the reactor core, and a double articulating connector link joining the lower end of the housing and the support foot assembly. The articulating connector link is such as to permit lateral movement of the lower end of the fuel assembly housing relative to an imaginary line defined between the upper end of the housing and the support foot assembly.

When such a fuel assembly arrangement is placed in the reactor core with the upper end of the housing and the foot assembly being rigidly retained in position, the double articulating connector will permit the lower end of the fuel assembly to be laterally displaced and thereby tend to alleviate some of the aforementioned structural and other problems. By allowing lateral displacement of the lower end of the housing, the stresses experienced by the housing due to the neutron induced swelling and thermally induced expansions will tend to be much less than those for a similar fuel assembly which is retained against any lateral movement. Since these stresses are less, then the width or lateral dimension of the fuel assembly can be increased in order to accommodate a greater plurality of fuel elements therein. This accordingly will provide for more economic fuel costs.

Furthermore, the difficulties in refueling the reactor will be alleviated since the permanent distortions experienced by the fuel assembly will be less such that the fuel assemblies are less likely to get hung up as they are being removed. Also the positional freedom of the lower ends of the fuel assembly housings tends to aid in alleviating this problem.

Further still, as the power and thus the temperature of the reactor are increased, the lower ends of the fuel assembly will be caused to spread out more due to the permitted lateral displacement. This has the effect of decreasing the reactivity of the core which in turn will reduce the power and temperature experienced within the core. This negative reactivity effect insures safe operation of the reactor core during transients in the reactor.

DESCRIPTION OF THE PREFERRED EMBODIMENT

Figure 1:
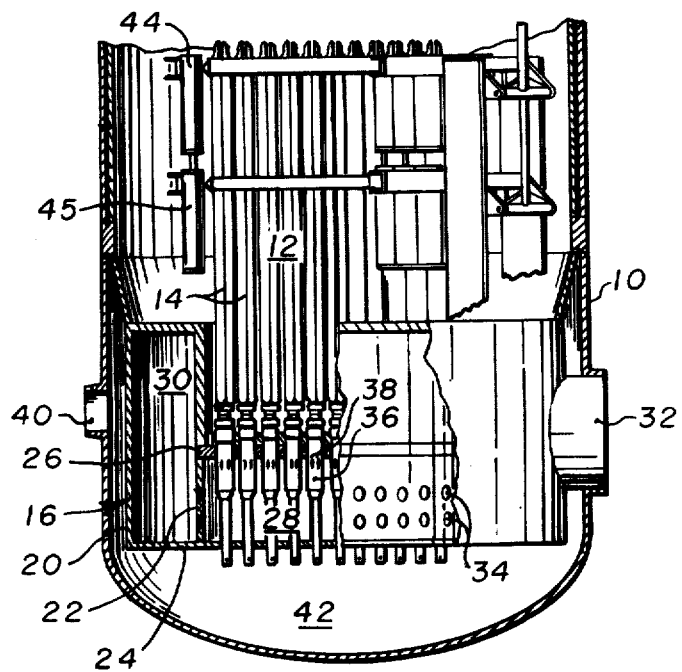
FIG. 1 is a vertical section of a fast spectrum reactor which has fuel assemblies incorporating the present invention.

Referring now to the drawings, FIG. 1 illustrates a substantially closed reactor vessel 10 housing a core 12 which consists of a plurality of fuel assemblies 14. A distribution and support assembly 16 is supported from the reactor vessel 10 which surrounds and supports the core 12. The distribution assembly 16 is comprised of an outer cylinder 20, an inner cylinder 22, a lower alignment plate 24 and a lower grid support plate 26 arranged to define interior and exterior distribution chambers 28 and 30 respectively. A high pressure coolant inlet conduit 32 attaches to the vessel wall in fluid communication with the exterior distribution chamber 30 for circulating the coolant fluid through flow openings 34 in the inner cylinder 22 and then up through the core 12. A plurality of support tubes 36 are rigidly fixed to the grid plate 26 and the alignment plate 24 to provide support for the lower ends of the fuel assemblies 14. Each of the support tubes 36 are provided with flow slots 38 for distributing the coolant fluid in the interior chamber 28 up through the interior of each of the fuel assemblies 14. A second coolant inlet conduit 40 is attached to the vessel wall to provide low pressure coolant fluid in a low pressure plenum 42 which will act in conjunction with the high pressure coolant fluid in the interior chamber 28 to hydraulically hold down the fuel assemblies 14. Such an arrangement is well known in the art and forms no part of the present invention. The upper ends of the fuel assemblies 14 are held in a tight relationship by two axially spaced clamps 44 and 45 which act to restrain the upper ends against lateral movement. The use of clamps is also well known in the art and forms no part of this invention.

Figure 2:
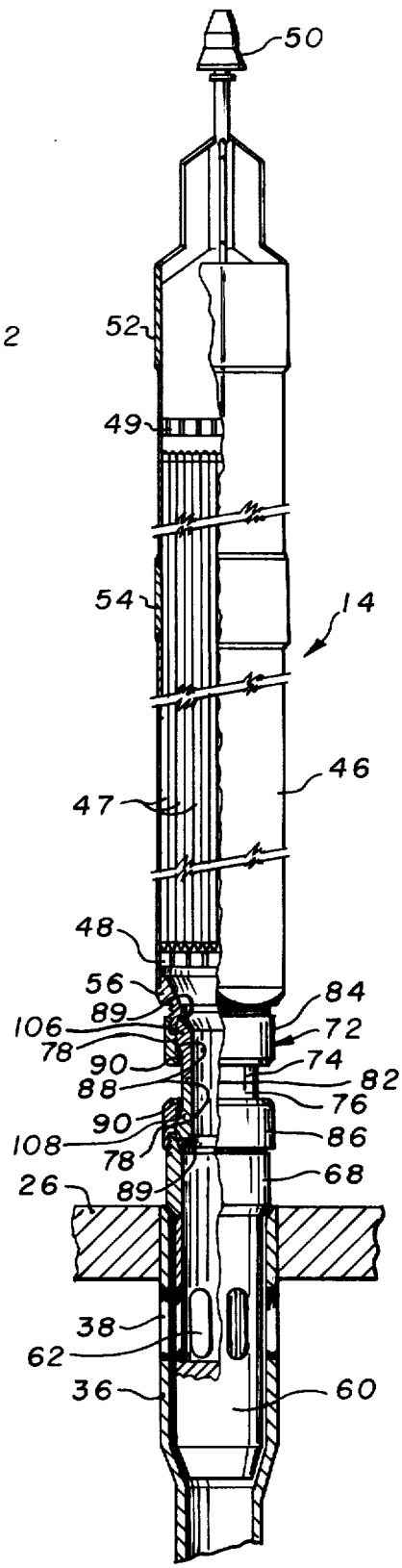
FIG. 2 is an enlarged elevational view of one of the fuel assemblies of FIG. 1 positioned within the support grid plate.

The fuel assemblies 14 as shown in FIG. 2 are hexagonal in cross section and each comprises a housing 46 having a hollow interior defined by an axially elongated shrroud whose lower end is secured to an end closure 56. The upper end of the shroud attaches to a handling head 50. The housing 46 has integrally formed thereon upper and lower spaced pads 52 and 54 near its upper end. These spacer pads 52 and 54 are the pads on which the clamps 44 and 45 in the reactor vessel 10 act to restrain the fuel assemblies against lateral movement at their upper end. The lower spacer 54 has a slightly smaller outer dimension for a purpose to be described hereinafter.

Each of the fuel assemblies 14 contains a plurality of fuel pins 47 arranged in a cluster within the housing shroud 46. These pins 47 are attached to a lower support grid 48 disposed adjacent to the lower end of the fuel assembly 14 in any well known manner. An upper retaining grid 49 is axially disposed above the fuel pins and spaced slightly therefrom to prevent ejection of the fuel pins 47 from the assembly in the case where the connection to the grid 48 fails. At the lower end of the fuel assembly 14 there is provided a hollow support foot 60 for supporting the lower end of the assembly 14 in the core 12 which is adapted to be received within a support tube 36 integrally attached to the grid plate 26. As with the support tubes 36, each support foot 60 is provided with a plurality of flow slots 62 below the elevation of the grid plate 26 to allow coolant fluid in the interior chamber 28 to enter the hollow interior of the support foot 60 and flow upward through the fuel assembly 14 and over the fuel pins 47. The support foot 60 terminates in an upper end closure 68 above the grid plate 26.

The support foot 60 and the lower end of the fuel assembly housing 46 are joined together by means of an articulating connector link 72 which provides two axially spaced articulating joints 106, 108. In the particular embodiment shown in FIG. 2 the articulating connector link 72 is a double ball joint which comprises integrally joined upper and lower half members 74 and 76 each of which has a spherical surface 78 defined on its outer surface. Upper and lower retaining nuts 84 and 86, each having inner complementary spherical surfaces 88 defined thereon for engagement with outer spherical surfaces 78, are threaded, respectively, onto the lower end closure 56 of the housing 46 and onto the upper end closure 68 of the support foot 60 to join the articulating connector link 72 to the housing 46 and the support foot 60. The two end closure members 56 and 68 also each have an inner spherical surface 89 which engages with the spherical surfaces 78 of the double ball joint. It should be particularly noted in FIG. 2 that each retaining nut 84 and 86 is provided with a clearance space 90. This is necessary in order to permit the articulating movement of the articulating connector link 72 in each of the two joints 106,108. Thus the upper member 74 of the articulating connector link 72 is joined to the lower end of the housing shroud 46 with the spherical outer surface 78 engaging the inner spherical surface 88 and being movable therein as a result of providing clearance space 90 between the nut 84 and the upper member 74 of the connector 72. The lower half 76 of the connector 72 is joined to the foot assembly 60 in a similar manner and is capable of a similar type of articulating movement. In this arrangement it is necessary to provide an upper half member 74 and a lower half member 76 in order to initially place the retaining nuts 84 and 86 over the spherical surfaces 78. The upper and lower members 74, 76 are then welded along weld joint 82 to provide a rigid connecting link 72.

As is apparent, with the use of a double articulating connector, the lower end of the fuel assembly housing 46 can be joined to the support foot assembly 60 so as to permit lateral and angular displacement of the housing lower end when the fuel assembly 14 is placed in the reactor core 12 relative to an imaginary line drawn between the fixed upper end of the housing 46 and the fixed foot assembly 60. It should also be realized that means other than a double ball joint can be used to accomplish the end. As will be remembered, in this application articulation is defined as the state of being jointed or having localized areas of increased or complete flexibility. Accordingly, such other means might comprise a plurality of rods each having a greater flexibility than the housing 46 or foot assembly 60 which are attached to the housing lower end and support foot assembly 60. In this situation, the flexible rods would provide articulating movement at each end of the rods as well as along the entire length of the rods.

In order to obtain the maximum benefit of the increased flexibility of the fuel assembly 14 it is preferable to initially displace the lower end of the fuel assembly housing 46 as it is placed in the core 12 so as to provide for the greatest lateral deflection when the fuel assembly 14 is subjected to irradiation and thermal gradients. This is accomplished in the preferred embodiment by making the lower pad 54 at the upper end of the housing 46 of a slightly smaller outer dimension than the upper pad 52. Accordingly, when the clamps 38 and 40 apply their clamping forces to the fuel assemblies 14, the lower ends of each of the fuel assembly housing shrouds 46 will be displaced inwardly toward the center of the reactor core.

Figure 3:
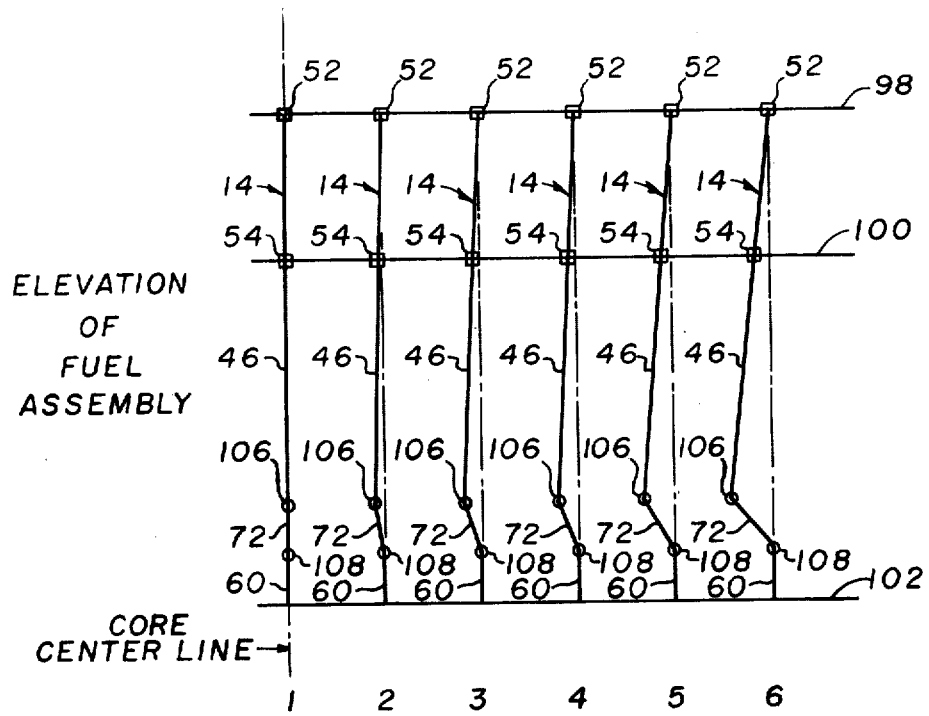
FIG. 3 is a schematic view of a plurality of fuel assemblies initially clamped into position within the reactor core.

FIG. 3 depicts schematically such an arrangement wherein the lower pads 54 of successive fuel assemblies out from the center of the core are laterally deflected progressively greater distances toward the core center line. For example, in FIG. 3 where the row numbers 1, 2, 3, 4, 5, and 6 represent respectively successive fuel assemblies out from the core center line, the pad 54 of the second fuel assembly is deflected a first distance toward the core center line, the pad 54 of the third fuel assembly is deflected twice the first distance, etc., so that the pad 54 for the sixth fuel assembly is deflected the greatest distance. It should be noted that the feet 60 of each of the fuel assemblies 14 are in axial alignment with the upper end of the fuel assembly as represented by pads 52 and that the lines 98, 100 and 102 represent lines of lateral restraint as imposed by the clamps 44, 45 and the support tubes 36. As a result of the deflection of the pads 54 when the core arrangement is completely clamped, the lower ends of the housing shroud 46 also are displaced radially inward toward the center fuel bundle and the top of the fuel subassemblies 14 have a slight angle from the vertical towards the core center. This slight angle makes efficient use of the lateral motion available in the double ball joint 72 while maintaining a minimum separation between fuel subassemblies 14. The angle increases towards the outer diameter of the core thus making the greatest lateral motion available at the outer core edge where temperature and neutron flux variation is greatest.

During operation of the reactor a non-uniform neutron flux and temperature distribution is generated and subjects the fuel assemblies 14 to neutron induced swelling and induced theremal expansions. Usually the neutron flux is greatest nearest the center of the core and accordingly the greatest neutron induced swelling occurs on the sides of the fuel assemblies 14 facing toward the center of the core. However, the neutron flux variation laterally across a fuel assembly is greatest on the core periphery and therefore these fuel bundles will experience the greatest physical distortion. Furthermore, the temperature to which the fuel bundles are subjected is proportional to the neutron flux and accordingly the fuel assembly is subjected to a thermal gradient across its lateral dimension. Again the side of the fuel assembly 14 subjected to the higher temperature expands substantially more than the side subjected to a lower temperature. The combination of these two effects causes the fuel assemblies to bow or bend convexly toward the center of highest neutron flux and highest temperature with the outer fuel assemblies experiencing the greatest physical distortion.

Figure 4:
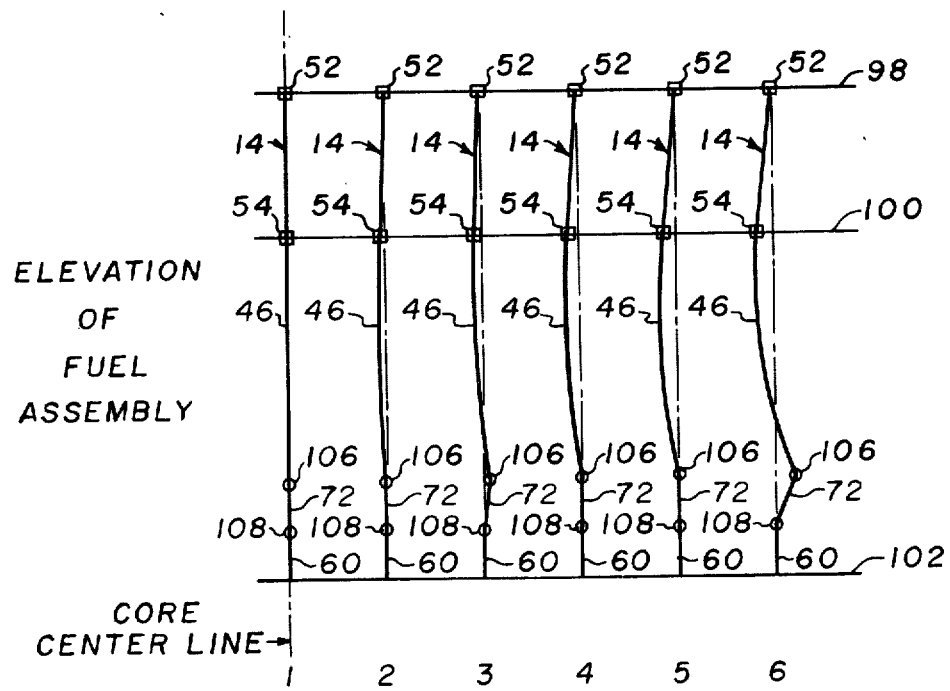
FIG. 4 is a schematic view similar to FIG. 3 in which the fuel assemblies have undergone physical distortions as a result of non-uniform irradiation and non-uniform temperatures.

FIG. 4 is a schematic similar to that of FIG. 3 depicting the arrangement of fuel assemblies after they have been subjected to neutron swelling and thermal expansion. As can be seen, as the sides of the fuel assemblies closest to the core center deform more than their opposite sides, the joint 106 of the double ball joints 72 moves away from the core center thus causing the lower end of the fuel assembly housing 46 to move to the right. This bowing experienced by each of the fuel assembly shrouds becomes progressively increased for successive fuel assemblies out from the core center. This is due to the fact that the neutron flux variation and temperature variation across a fuel assembly becomes increasingly greater.

As is readily apparent from FIG. 4, the provision for lateral movement and angular deflection of the lower end of the fuel assembly shroud 46 helps to decrease the stress which each shroud is subjected to. This is most apparent in the sixth fuel assembly outward from the center of the core in which the double ball joint 72 has moved from an inwardly or centrally inclined position initially to an outwardly inclined position after being subjected to neutron induced swelling and thermally induced expansion. The shroud stresses would be greatly increased if the lower end of the shroud 46 were to be retained in its central position as shown in FIG. 3.

It should be noted that the provision for lateral movement or a lateral degree of freedom at the lower end of the fuel assembly insures a safe operation of the reactor. As is well known in the art, as elongated fuel assemblies are moved laterally apart from one another there is a decrease in the reactivity in the core of the reactor. During transients, as the power is increased, both the temperature and neutron flux are increased thereby producing a greater lateral separation between fuel assemblies utilizing the present invention. This lateral separation or displacement causes a decrease in the reactivity which in turn acts to reduce the temperature and the level of neutron flux. This insures a safe operation of the reactor by insuring that the reactor will be stable.

Further still, by providing for positional freedom of the lower end of the fuel assembly shrouds 46 relative to their respective support feet 60, refueling difficulties will be reduced which are otherwise often experienced after irradiation. This is due to the permanent bends which remain in the fuel assemblies after irradiation. Lateral displacement freedom permits the fuel assemblies 14 to be moved around and oriented to allow for relatively easy removal from the reactor core.

It will be understood that the embodiment shown and described herein is merely illustrative and that changes may be made without departing from the scope of the invention as claimed.

What is claimed is:

1. A nuclear reactor comprising:
    (a) a reactor vessel having a nuclear core therewithin;
    (b) a plurality of fuel assemblies for said nuclear core each of which includes:
        1. a plurality of longitudinally extending fuel elements; and
        2. an elongated hollow housing surrounding said plurality of fuel elements;
    (c) means for supporting said fuel assembly in said nuclear core, said means being restrained against movement and axially spaced from the lower end of said fuel assembly housings;
    (d) clamping means for clamping the upper ends of said fuel assembly housings in said nuclear core to restrain the upper ends of said housings against lateral movement; and
    (e) means for inserting negative reactivity comprising a double articulating connector for each of said fuel assemblies for connecting the lower end of said fuel assembly housings to said support means, each of said double articulating connectors permitting articulating movement at both its upper and lower ends so as to allow lateral movement of the lower end of said housing relative to said restrained upper end of said housing and said restrained support means.

2. The nuclear reactor of claim 1 wherein said restrained upper ends of said fuel assembly housings are in axial alignment with said support means; and wherein there is provided means for initially displacing the lower end of said fuel assembly housings laterally toward the center of said nuclear core relative to said axially aligned upper end of said housing and said support means.

3. The nuclear reactor of claim 2 wherein said clamping means and said displacing means comprise:
   a first clamp pad for each of said fuel assembly housings, said first clamp pads being integrally attached to said fuel assembly housings adjacent its upper end and being of a first outer dimension;
   a second clamp pad for each of said fuel assembly housings, said second clamp pads being integrally attached to said fuel assembly housings adjacent its upper end axially below said first pads and being of a second outer dimension which is less than said first outer dimension;
   and two axially spaced clamps adjacent said first and second clamp pad on said fuel assembly housings.

4. The nuclear reactor of claim 3 wherein said double articulating connector is a connector link having two axially spaced ball joints.

* * * * *